United States Patent [19]

Okuda

[11] 4,126,018

[45] Nov. 21, 1978

[54] APPARATUS FOR INTERCONNECTING ROTARY SHAFTS

[75] Inventor: Hiroji Okuda, Nara, Japan

[73] Assignee: Koyo Seiko Company Limited, Osaka, Japan

[21] Appl. No.: 819,215

[22] Filed: Jul. 25, 1977

[51] Int. Cl.² ............................ F16D 3/06; F16D 3/26; F16D 3/84

[52] U.S. Cl. .......................... 64/23; 64/17 R; 64/32 F

[58] Field of Search ................ 64/21, 17 R, 23, 9 R, 64/8, 11 B, 15 C; 403/26, 287, 1, 305, 166

[56] References Cited

U.S. PATENT DOCUMENTS

| | | | |
|---|---|---|---|
| 1,915,399 | 6/1933 | Bibby | 64/15 B |
| 2,136,947 | 11/1938 | Morgan | 64/9 |
| 2,177,845 | 10/1939 | Sloan | 64/9 R |
| 2,375,030 | 5/1945 | O'Malley | 64/8 |
| 2,468,182 | 4/1949 | Dempsey | 64/23 X |
| 2,626,000 | 1/1953 | Yergens | 64/4 X |
| 2,654,234 | 10/1953 | Christensen | 403/305 X |
| 2,898,749 | 8/1959 | Parkman | 64/8 |
| 3,132,494 | 5/1964 | Hoffer | 64/9 R |
| 3,279,215 | 10/1966 | Edwards et al. | 64/4 |
| 3,605,439 | 9/1971 | Filepp | 64/9 R |
| 3,842,187 | 10/1974 | Barkan | 403/287 |
| 3,871,466 | 3/1975 | Bessiere | 180/70 P |
| 3,975,922 | 8/1976 | Orain | 64/17 R |

FOREIGN PATENT DOCUMENTS

| | | | |
|---|---|---|---|
| 2,355,433 | 6/1974 | Fed. Rep. of Germany | 64/9 R |
| 1,274,525 | 9/1961 | France | 64/15 B |
| 717,424 | 10/1954 | United Kingdom | 64/1 C |
| 476,382 | 11/1975 | U.S.S.R. | 403/166 |

*Primary Examiner*—Leslie Braun
*Attorney, Agent, or Firm*—Mason, Fenwick & Lawrence

[57] ABSTRACT

The opposed ends of a plurality of aligned rotary shafts are connected together by a spindle assembly including universal joints at its opposite ends. The spindle assembly comprises a splined spindle, sleeve-shaped flanged yokes slidably mounted on the opposite ends of the splined spindle respectively, and fitting yokes connected by trunnions to the flanged yokes respectively and each formed with a bore for receiving the end of the rotary shaft so as to be rotatable therewith only in the direction of rotation of the rotary shaft. The splined spindle is provided at each of its opposite ends with a stopper member engageable with the opposed end of the flanged yoke to retain the flanged yoke on the spindle. A sealing member in the form of bellows is provided between the flanged yokes.

4 Claims, 5 Drawing Figures

APPARATUS FOR INTERCONNECTING ROTARY SHAFTS

BACKGROUND OF THE INVENTION

The present invention relates to an apparatus for interconnecting rotary shafts, and more particularly to a shaft connecting apparatus suitable for use as power transmission means for the rolls of rolling mills.

With a rolling mill as shown in FIG. 1, a plurality of rolls $B_1$, $B_2$, $B_3$, $B_4$ arranged in a row are driven by single drive means A through drive spindles $C_1$, $C_2$, $C_3$ interconnecting the drive means and the rolls. Since the spacing L between the adjacent rolls in this arrangement is very small, couplings $a$ as shown in FIGS. 2 and 3 are usually used in the interconnecting drive spindles $C_1$, $C_2$, $C_3$ to connect a drive shaft $b$, a driven shaft $c$ and an intermediate shaft $d$ together.

In the case of such rolling mills, the level of the roller during rotation undergoes delicate variations, so that the shafts $b$, $c$, $d$ of the drive spindle must be adapted for angular displacement. For this purpose, clearances $S_1$ are provided between the couplings $a$ and shafts $b$, $c$, $d$ fitting therein, while clearances $S_2$ are also provided between the opposed ends of the shafts $b$, $c$, $d$. However, when the shafts are thus loosely fitted in the couplings, the intermediate shaft $d$ during the rotation of the drive shaft undergoes vibration in the direction of the rotation and oscillation in the axial direction, giving rise to wear on the surfaces of the coupling $a$ and the shafts $b$, $c$, $d$ in fitting contact with each other. Moreover, the vibration and oscillation will be delivered to the rolls and other portions of the rolling mill, consequently reducing the accuracy of the rolling operation and causing damage to the mechanical parts early. Presumably, these problems can be overcome if the intermediate shaft $d$ is provided, as its opposite ends, with universal joints of the trunnion type which permit a free angular displacement, such that fitting yokes on the universal joints are connected to the drive shaft $b$ and to the driven shaft $c$, but this arrangement renders the drive spindle excessively great in its overall length and is not usable in rolling mills in which the roll-to-roll spacing L is limited as already stated.

SUMMARY OF THE INVENTION

The object of this invention is to basically overcome the foregoing problems and to provide an apparatus for interconnecting rotary shafts which is free of vibration or oscillation during rotation, permits free angular displacement, is short in its overall length and can be lubricated with stability over a prolonged period of time.

The apparatus of this invention comprises a short splined spindle, sleeve-shaped flanged yokes slidably fitting around the opposite ends of the splined spindle respectively and each serving as an element of a universal joint, and two fitting yokes disposed outside the flanged yokes and connected thereto by trunnions and bearings respectively, each of the fitting yokes being provided with a fitting portion for receiving the neck of a roll or the end of a rotary shaft and rotatable therewith in the direction of rotation of the shaft.

The flanged yokes are opposed to each other at the midportion of the splined shaft. A seal in the form of bellows is provided between the flanges of the flanged yokes, surrounding the splined spindle.

According to a modified embodiment of this invention, spring members are provided in the interior of the seal to bias the flanged yokes away from each other axially of the splined spindle.

Preferably, the bellows-shaped seal is made from an oil-resistant heat-resistant synthetic resin or from canvas coated with such synthetic resin. The spring members in the modified embodiment are interposed between the flanged yokes as equidistantly spaced apart along a circle concentric with the flanged yoke.

The splined spindle is provided with stopper members engageable with the flange yokes respectively to retain the flanged yokes, and therefore trunnions, on the splined spindle during the sliding movement of the flanged yokes relative to the spindle.

The apparatus of this invention is useful for rotary shafts, especially for the replacement of rolls in rolling mills. The fitting yoke is detachable from the neck of a roll merely by removing a key for locking the yoke to the roll neck and sliding the fitting yoke toward the spline spindle. The fitting yoke is fittable to the neck of a new roll merely by following this procedure reversely. Thus, replacement of rolls can be carried out with extreme ease.

The bellows-shaped seal serves to protect the splined spindle, to retain the lubricant and to prevent ingress of dust from outside.

The apparatus of this invention is further characterized by its extremely short length such that rolls or rotary shafts which are spaced apart by a small end-to-end distance can by connected together by the apparatus, since the opposite ends of the splined spindle are opposed to cylindrical bores extending centrally through the trunnions of the universal joints.

The bellows-shaped seal is useful in that it retains lubricant therein so as to effectively lubricate the spindle and the members fitting thereto over a prolonged period of time. However, the seal can be dispensed with depending on the particular situation in which connected rolls or shafts are used.

DESCRIPTION OF THE PREFERRED EMBODIMENTS

Figure 1:
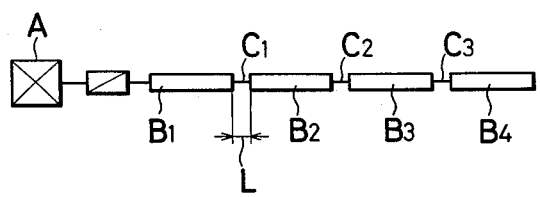
FIG. 1 is a diagram showing rolls or shafts as connected together.
Figure 2:
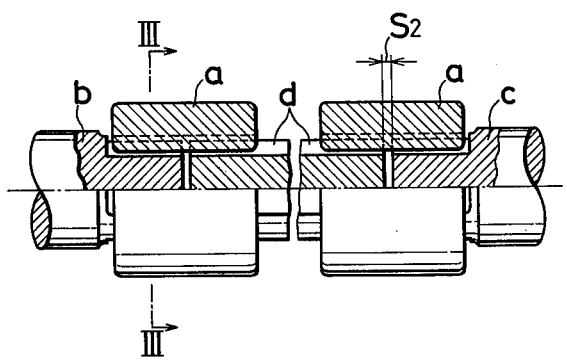
FIG. 2 is a front view of a known connecting assembly, one half of the assembly being shown in vertical section.
Figure 3:
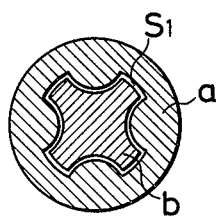
FIG. 3 is a view in section taken along the line III—III in FIG. 2.
Figure 4:
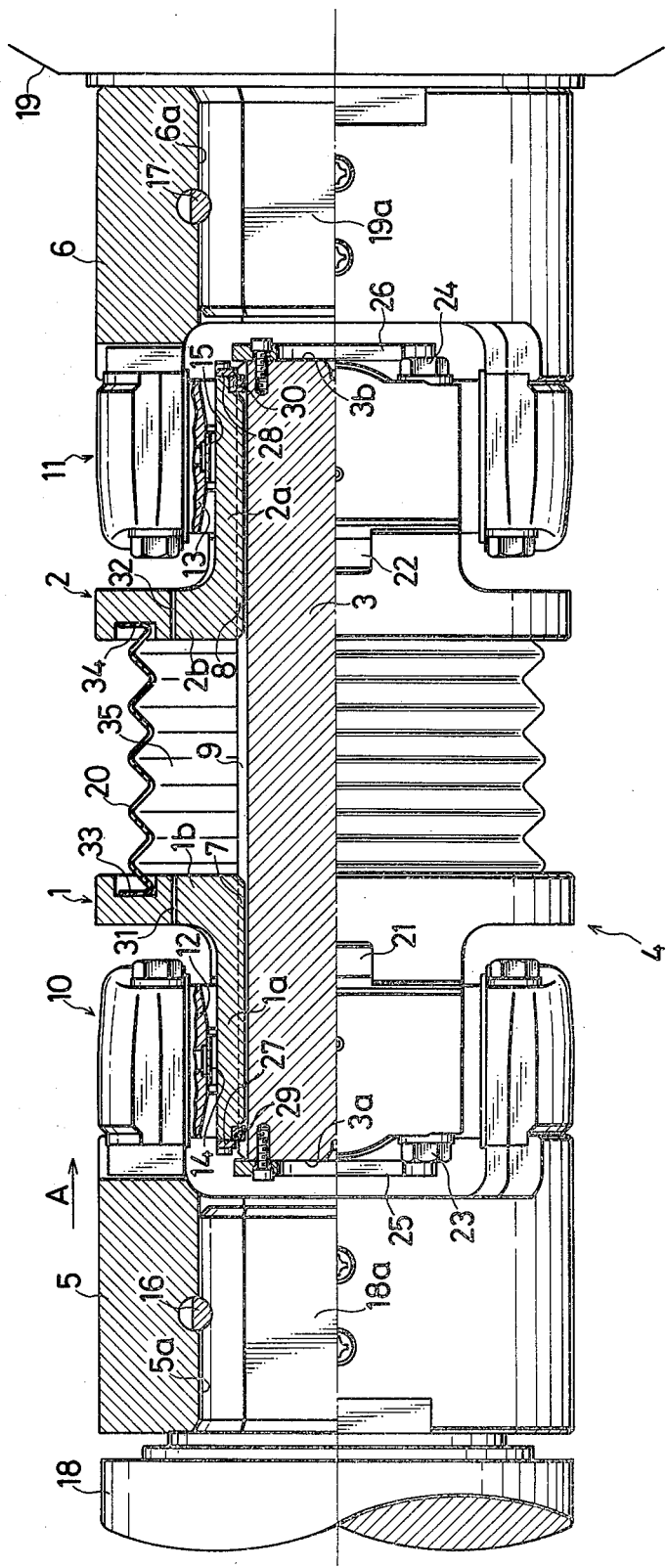
FIG. 4 is a front view of a preferred embodiment of this invention, one half of the embodiment being shown in vertical section.

FIG. 4 shows flanged yokes 1, 2 each serving as part of the universal joint of the trunnion type to be described later. The flanged yokes 1, 2 include sleeves 1a, 2a which are internally splined as at 7, 8. A splined spindle 3, externally splined as at 9, is splined to the flanged yokes 1, 2, providing a spindle assembly 4.

Universal joints 10, 11 comprise the flanged yokes 1, 2 and fitting yokes 5, 6 connected to the yokes 1, 2 by trunnions 12, 13. The trunnions 12, 13 are formed with cylindrical bores 14, 15 extending centrally therethrough and receiving therein the sleeves 1a, 2a of the flanged yokes 1, 2 of the spindle assembly 4.

The fitting yokes 5, 6 are in the form of a hollow cylinder and have fitting portions 5a, 6a fittable around the ends 18a, 19a of rolls or rotary shafts 18, 19 so as to be rotatable with the shafts 18, 19 in the direction of rotation of the shafts. The inside diameter of the fitting portions 5a, 6a is larger than the outside diameter of the splined portion 9 of the spindle 3.

Lubricant sealing members 29, 30 are provided on the inner peripheral ends of the sleeves 1a, 2a of the flanged yokes 1, 2 and are secured in place by holding plates 27, 28 attached by bolts to the ends of the sleeves 1a, 2a. The splined spindle 3 is provided with stopper plates 25, 26 secured to its ends 3a, 3b by bolts. The stopper plates 25, 26 extend radially outward to such an extent that the plates 25, 26 are engageable with the holding plates 27, 28 on the sleeves 1a, 2a to restrict the axial movement of the spindle 3.

The flanged yokes 1, 2 are of known construction and are keyed as at 21, 22 to opposed bearing cases on the trunnions 12, 13 and fastened thereto by bolts 23, 24. When the necks 18a, 19a of the rolls or rotary shafts 18, 19 are inserted into the fitting portions 5a, 6a of the fitting yokes 5, 6, the yokes are held to the necks by key bolts 16, 17.

Annular grooves 33, 34 are formed in the opposed surfaces of the flanges 1b, 2b of the flanged yokes 1, 2. A sealing member 20 in the form of bellows is secured at is opposite ends to the grooved portions 33, 34. The flanges 1b, 2b are formed with air ports 31, 32 extending therethrough. When the sealing member 20 is collapsed, the air in the interior of the sealing member flows out through these ports to prevent an increase in the internal air pressure. A lubricant can be placed in a space 35 defined by the bellows-shaped sealing member 20 and the flanged yokes 1, 2.

The present apparatus functions in the following manner for connection to the roll or rotary shaft 18.

When the fitting yoke 5 is to be separated from the rotary shaft 18, the key bolt 16 fastening the fitting portion 5a to the neck 18a of the rotary shaft 18 is removed, and the fitting yoke 5 is moved in the direction of arrow A in FIG. 4. The flanged yoke 1, which is connected to the fitting yoke 5 by the universal joint 10, slides on the splined spindle 3 in the direction A with the movement of the fitting yoke 5, permitting the fitting yoke 5 to separate from the neck 18a of the rotary shaft 18.

At this time, the sealing member 20 between the yokes 1 and 2, which is in the form of bellows, is folded and longitudinally collapsed. Although the splined spindle 3 tends to move with the yoke 1, the spindle 3 is prevented from movement by coming into contact with the end of the neck 19a of the other roll or rotary shaft 19 connected to the other fitting yoke 6 on the other end of the spindle.

Next, the fitting yoke 5 can be joined to the neck 18a of a new roll or rotary shaft merely by moving the fitting yoke 5 in reverse direction to the direction A toward the neck 18a which is placed in the same position as the old roll neck. Although the splined spindle 3 tends to move leftward in FIG. 4 with the movement of the flanged yoke 1 in the same direction, the stopper plate 26 on the other end 3b of the spindle 3 engages the seal holding plate 28 on the end of the other yoke sleeve 2a, thereby preventing the movement of the spindle 3.

Figure 5:
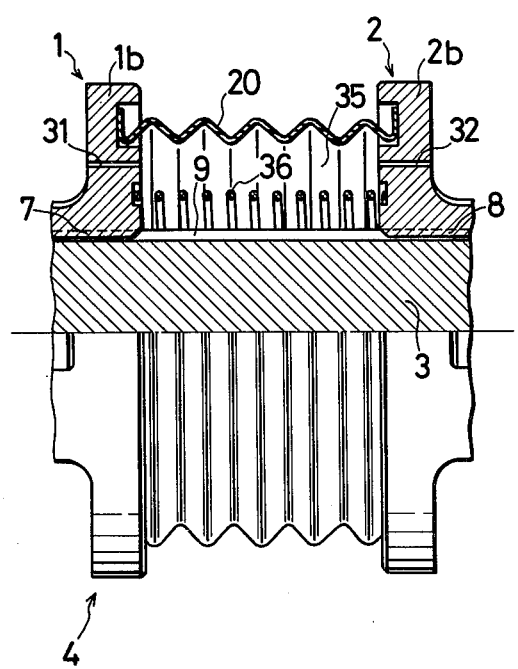
FIG. 5 is a front view partly in vertical section and showing a modified embodiment.

FIG. 5 shows another embodiment in which one to several spring members 36 are provided between the flanged yokes shown in FIG. 4 as spaced apart along a circle concentraic with the flanged yoke. The spring members 36 bias the yokes 1, 2 away from each other. Since the spring members urge the universal joints 10, 11 toward the rolls or rotary shafts 18, 19 at all times, the fitting yokes 5, 6 can be held connected to the rotary shafts 18, 19 without using the key bolts 16, 17.

This invention is not limited to the embodiments described above. Other changes and modifications may be made by those skilled in the art without departing from the spirit of the invention.

What is claimed is:

1. An apparatus for interconnecting rotary shafts comprising a splined spindle, flanged yoke members including sleeves slidably fitting around the opposite ends of the splined spindles respectively, and fitting yokes disposed outside the flanged yoke members and connected thereto by trunnions respectively, each of the trunnions being formed with a cylindrical bore extending centrally therethrough and receiving therein the sleeve of the flanged yoke member, and each of the fitting yokes being formed with a bore for receiving the end of a roll or rotary shaft so as to be connectable to the rotary shaft and rotatable therewith in the direction of rotation of the rotary shaft.

2. An apparatus as defined in claim 1 wherein the splined spindle is provided with a stopper plate projecting from each of its opposite ends and engageable with the end of the sleeve of the flanged yoke member.

3. An apparatus as defined in claim 2 wherein a sealing member in the form of bellows is provided between the opposed flanges of the flanged yoke members.

4. An apparatus as defined in claim 2 wherein spring means is provided between the opposed portions of the flanged yoke members to bias the yoke members away from each other.

* * * * *